United States Patent
Escobar et al.

(10) Patent No.: US 6,734,230 B1
(45) Date of Patent: May 11, 2004

(54) PROCEDURE FOR OBTAINING MODIFIED ACRYLIC SHEETS OF HIGH IMPACT RESISTANCE

(75) Inventors: Sergio Colin Escobar, Ocoyoacac (MX); Manuel Ahumada Romero, Ocoyoacac (MX); José Luis Peña Rosas, Ocoyoacac (MX); Maria Sonia Limon Rodriguez, Ocoyoacac (MX); Luis Enrique Mille Loera, Ocoyoacac (MX); Leopoldo Vilchis Ramirez, Ocoyoacac (MX)

(73) Assignee: Plastiglas de Mexico, S.A. de C.V., Ocoyoacac (MX)

( * ) Notice: Subject to any disclaimer, the term of this patent is extended or adjusted under 35 U.S.C. 154(b) by 0 days.

(21) Appl. No.: 10/030,756
(22) PCT Filed: Apr. 26, 2000
(86) PCT No.: PCT/IB00/00529
§ 371 (c)(1),
(2), (4) Date: Jul. 8, 2002
(87) PCT Pub. No.: WO00/65554
PCT Pub. Date: Nov. 2, 2000
(51) Int. Cl.[7] .............. C08J 3/20; C08K 5/34
(52) U.S. Cl. ........ 523/351; 524/718; 524/720; 525/289; 525/290; 525/309; 525/310; 525/440; 525/445
(58) Field of Search .......... 523/351; 524/718, 524/719, 720; 525/289, 290, 309, 310, 440, 445

(56) References Cited

U.S. PATENT DOCUMENTS

| | | | |
|---|---|---|---|
| 4,085,166 A | 4/1978 | DiLeone et al. |
| 4,287,317 A | 9/1981 | Kitagawa et al. |
| 4,530,973 A | 7/1985 | Koster et al. |
| 5,169,903 A | 12/1992 | Toritani et al. |
| 5,196,483 A | 3/1993 | Zimmerman et al. |

FOREIGN PATENT DOCUMENTS

| | | |
|---|---|---|
| GB | 1030497 | 5/1966 |
| GB | 1302069 | 1/1973 |
| JP | 09309934 A | 12/1997 |

OTHER PUBLICATIONS

Database WPI Section Ch, Week 199807, Derwent Publications Ltd., London, GB; AN 1998–071896 XP002159516, pp. 1–2.

Primary Examiner—Kriellion A. Sanders
(74) Attorney, Agent, or Firm—Knobbe, Martens, Olson & Bear, LLP

(57) ABSTRACT

A procedure for the production of a modified acrylic sheet with high impact resistance, of the type in which a prepolymerization is done of a mix of monomers with a polymer of dissolved dienic monomers. The procedure is done in batches at low temperatures without there being a separation of the polymer of dienic monomers from the rest of the mix. The procedure facilitates obtaining a modified acrylic sheet with high impact resistance whose transmittance is kept after being subjected to an accelerated degradation, and whose impact properties are not reduced more than 50% after said accelerated degradation.

38 Claims, No Drawings

PROCEDURE FOR OBTAINING MODIFIED ACRYLIC SHEETS OF HIGH IMPACT RESISTANCE

BACKGROUND OF THE INVENTION

1. Field of the Invention

This invention is related with techniques to obtain plastic sheets and more precisely, a modified acrylic sheet highly resistant to impact as well as the procedure to obtain this sheet.

2. Description of the Related Art

Acrylic sheets have been used for several years now for numerous applications requiring translucent or transparent materials, industrial or finished goods, as for the manufacturing of domes, molds for luminous advertisements, shelves for exhibiting products, office appliances, telephone booths, etc. Nevertheless, it is widely known that the generic acrylic sheets commonly used for such applications, have very little resistance to impact, therefore the goods manufactured with the latter are very fragile. Considering the above, polymeric compositions have been developed for some time now, which permit to obtain impact resistant sheets, which may be used for the aforementioned applications.

The majority of the compositions with impact resistant materials include at least one monomer of alkyl-acrylate mixed with some elastomeric material. It is worth mentioning that these compositions may also include ethylenically unsaturated co-monomers, or other alkyl-acrylates, styrene and its derivatives or vinyl chloride. Likewise, the elastomeric material may also be a homopolymer or a copolymer, like polybutadiene, polyisoprene, polyisobutylene, copolymers of butadiene-styrene, and butadiene-acrylonitrile polymers. There are various procedures to obtain sheets containing acrylic monomers in their composition. However, the majority requires a stage of polymerization of the monomers carried out at low conversions until obtaining a prepolymer, known as syrup or honey because of its consistency. Later it undergoes a stage of controlled temperature curing, in which the polymerization of the monomers is completed, finally obtaining the desired sheet with the characteristics corresponding to the composition of which it comes from.

It is worth mentioning that there also exist several methods to make the curing of the prepolymers and obtain the sheets, like the curing in molds (also known as "CELL CAST"), curing by rolling and continuous curing, amongst others.

In the case of acrylic compositions with improved resistance to impact, as mentioned above, an elastomeric material is added to the used monomer mix, usually before doing the prepolymerization. However, these elastomeric materials, during the polymerization executed at a low conversion in order to form the prepolymer, become incompatible with the medium and tend to separate themselves. The reason of this incompatibility is that the elastomeric materials have different degrees of density and viscosity than the prepolymer, the consequence is a tendency of the elastomeric materials to separate themselves from the mix, provoking a separation or inversion of phases.

There is an important variety of compositions with high impact resistance, like the ones described in the U.S. Pat. Nos. 4,085,166, 4,530,973, 5,169,903 and 5,196,483. However, the majority of these compositions need to be prepared from a mix of materials, including an important quantity of monomers, under difficult to control operation conditions and using sophisticated equipment (high temperature and pressure reactors). This means said compositions make the production of sheets with a high impact resistance very expensive.

One of the most complete works on acrylic compositions with high impact resistance is the one reported by Kitagawa, et. al., in the U.S. Pat. No. 4,287,317. It describes an acrylic polymer composition resistant to impact. In said patent, a continuous process is used to polymerize the components and form the honey. In the chapter on the state of the art, it is also stated that there are a wide variety of problems when doing mass polymerization of these types of materials, due to the aforementioned problem of separation and inversion of phases.

According to the description of Kitagawa, et. al., when they presented their patent request there was no procedure enabling to produce acrylic prepolymers modified with elastomeric materials with viscosity, which would enable the production of sheets, and at the same time obtain the characteristics of transparency and stability these sheets need. Therefore that patent describes a process to produce a stable polymer from the aforementioned mix of 100 parts in weight of a monomer or a mix of monomers containing from 80% to 100% in weight of methyl methacrylate and 0% to 20% in weight of an ethylenically unsaturated monomer, which can be copolymerized with methyl methacrylate, which are mixed with 1 to 20 parts in weight of an elastomeric polymer, until forming an homogeneous mix which is prepolymerized until it reaches 5 to 40% of conversion, through the addition of an appropriate initiator. A final composition will be obtained of 66% to 99 % in weight of methyl methacrylate, 0% to 20% in weight of the ethylenically unsaturated monomer, which can be copolymerized with the methyl methacrylate and 0.99% to 16.7% in weight of the elastomeric polymer. This allows in turn to produce a sheet with characteristics of high transparency and resistance to impact.

The procedure to obtain the prepolymer is very important since according to Kitagawa, et. al., the production of the prepolymer requires a strict control of flows and temperatures in two stages of reaction, which greatly increases the cost of operation.

Furthermore, the same patent mentions that the temperature of the prepolimerization reaction must be kept between 90 to 200° C., and states that lowering the temperature of the reaction results in an instability of the phases of the mix. This in turns means that the progress of the reaction won't be satisfactory, which causes a separation of the particles of the elastomeric polymer, and processing problems.

However, the fact of maintaining these strict conditions of flow and temperature control, results in an increase of the operation costs. It also forbids producing the prepolymer in a batch process. This is very inconvenient for applications in which the same equipment is used to obtain different types of sheets.

It is important to mention that the elastomeric polymer most used for reinforcing monomers is polybutadiene, which, like all polymers obtained from dienes, is chemically and thermally very unstable. This means that the transparency of the sheets obtained through polybutadiene mixes may be considerably affected by time. Concerning this point, in one of the examples of the U.S. Pat. No. 4,287,317, it says that the sheets obtained do not loose their transparency after 1000 hours of accelerated degradation. However, the parameters under which the accelerated degradation is made are not stated and, given the ease of degradation of the polybutadiene, it is very difficult to achieve a high stability of the latter, since no mention is made of the addition of a stabilizing agent in the composition. This means it is likely that the conditions of accelerated degradation were not drastic enough to insure proper transparency during the useful life of the sheet.

Considering the above, it has been tried to eliminate the inconveniences of the modified acrylic sheets currently used, by developing a modified acrylic sheet with a high impact resistance. This sheet, apart from resisting impact, would keep its transparency and resistance to impact properties throughout its useful life and would have characteristics suitable for submission to ulterior processes.

PURPOSES OF THE INVENTION

It is another purpose of the invention, to provide a procedure for the production of a prepolymer including a dissolved polymer of very high impact resistance, enabling the operation at a low temperature.

Another purpose of the invention is to provide a procedure to produce a prepolymer including a dissolved polymer of very high impact resistance, enabling the operation per batch. This will facilitate the production of prepolymers with different characteristics with the same equipment.

Taking into account the defects of the previous technique, it is the purpose of this invention, to provide a modified acrylic sheet with high impact resistance, which will maintain its transparency during its whole useful life.

It is another purpose of this invention, to provide a modified acrylic sheet with high impact resistance, which maintains its transparency in finished products even after being submitted to ulterior procedures, as thermal procedures like thermoforming, or superficial ones like gluing and/or color application.

It is another purpose of this invention, to provide a modified acrylic sheet with high impact resistance, with a low molecular weight, which provides optimal mechanical and fluid properties to enable its ulterior processing.

DETAILED DESCRIPTION OF THE PREFERRED EMBODIMENT

The procedure to obtain the used prepolymer for the production of the modified acrylic sheet with high impact resistance of this invention, is divided into a first stage of mixing followed by a stage of prepolymerization.

The mixing stage consists in preparing a mix of monomers containing approximately 1 to 6 parts in weight of a polymer of a dienic monomer with a particle size enabling its dissolution, preferably particles of approximately 1.5 to 3 cm; up to approximately 20 parts of an ethylenically unsaturated monomer copolymerizable with methyl methacrylate; and approximately 70 to 99 parts of an alkyl acrylate or alkyl methacrylate, preferably methyl methacrylate.

The resulting mix of monomers must be shaken until it forms one homogeneous phase in which the polymer of a dienic monomer is dissolved in the other monomers.

Additionally, when starting to mix, a composition of stabilizing agents for ultraviolet light is incorporated. This composition contains Hals stabilizers and stabilizers derived from benzotriazole, which have a synergic effect enabling to obtain a modified acrylic sheet with high impact resistance with no variation in its transmittance after 1000 hours of exposure to accelerated degradation by Xenon ultraviolet light (ASTM G 26-92). In the preferred modality of this invention, approximately 0.1 to 1.5% in weight with respect to the monomer mix, of the stabilizing agents mix for ultraviolet light is added.

In a preferred modality of the invention, the stabilizing agents for Hals ultraviolet light are selected between bis-(1-Octyloxy-2,2,6,6,tetramethyl-4-piperidine)sebacate; polymero of dimethyl succinate with 4-hidroxy-2,2,6,6, tetramethyl-1-piperidine ethanol; bis(2,2,6,6,-tetramethyl-4-piperidine)sebacate; 1,3,5-triazine-2,4,6-triamino, N,N'''-[1, 2-ethanediilbis[[[4,6-bis[butyl(1,2,2,6,6-pentamethyl-4-piperidine)amino]-1,3,5-triazine-2-il]imino]-3, 1propanediil]]-bis[N',N''dibutyl-N',N''-bis(1,2,2,6,6-pentamethyl-4piperidine)-; poly-[[6-[(1,1,3,3,-tetramethyl butyl)amino]-s-triazine-2,4-diil][[(2,2,6,6-tetramethyl-4-piperide)imino]hexamethylene[(2,2,6,6,tetramethyl-4-piperide)imino]]; or, mixes of the same; while the stabilizing agents for ultraviolet light derived from benzotriazole are selected preferably from 2-(2',hydroxy-5-methyl-phenyl) benzotriazole; 2-(2H-benzotriazole-2-il)-4,6-bis(1-methyl-1-phenylethyl)phenol; 2-(5-chloro-2H-benzotriazole-2-il)-6-(1,1-dimethylethyl)-4-methylphenol; 2-(3',5'-di-ter-butyl-2'-hydroxyphenyl)-5-chlorobenzotriazole; 2-(2H-benzotriazole-2-il)-4,6-bis(1,1-dimethylpropyl)phenol; or, mixes of the same.

In a specific modality of this invention, the mix of stabilizing agents for ultraviolet light is made of 2-(2', hydroxy-5-methyl-phenyl) benzotriazole y bis-2,2,6,6-tetramethyl-4-piperidine) sebacate, said mix containing preferably 50% in weight of each one approximately.

In a preferred modality of this invention, the polymer of a dienic monomer is polybutadiene, preferably of the kind with a high cys content and the ethylenically unsaturated monomer is styrene.

Once the polymer coming from a dienic monomer is dissolved, an initiating agent is added in a quantity of approximately 0.01 to 0.05% in weight with respect to the monomer mix, and is brought to a temperature kept between 70 to 95% approximately, at an atmospheric pressure. In a preferred modality of this invention, the initiating agent is selected from initiators of the peroxyde type and the azo type, preferably between terbutyle peroxypivalate and azo-bis isobutyronitrile.

The prepolymerization is made until reaching a viscosity of the prepolymer of 18 to 21 seconds in a Ford Cup No 6 at the reaction temperature, after which the prepolymer cools down.

The cold prepolymer of this invention has a final viscosity of approximately 45 to 50 seconds in a Ford Cup No 6 at ambient temperature, with a conversion of 8 to 30% approximately, a particle size of the polymer of a dienic monomer of 0.1 to 1 microns approximately, and a molecular weight in approximate number of 100,000 to 1,000,000 daltons with polydispersities of approximately 2.0 to 3.5.

To obtain the desired sheet, a demolding agent is added to the prepolymer, preferably dioctyl sodium sulfosuccinate, in a quantity of 0.003% to 0.021% in weight with respect to the prepolymer approximately, as well as pigments in quantities varying according to the needs of the final destination of the sheet. Finally an initiating agent is added in a quantity of 0.15 % to 2% in weight with respect to the prepolymer, approximately.

Once the initiating agent has been added to the prepolymer, the latter is subjected to a curing stage, which can be done with any of the curing procedures found in the state of technique, preferably with the procedure of curing in molds. The curing in molds is done by introducing the prepolymer in a mold, which includes two template glass sheets, perfectly polished and free of any imperfections sealed by a joint made in a polymeric material fit for the thickness of the sheet which is being produced; securing the mold by means of several clamps to stop the prepolymer from exiting the mold, and which also enable to obtain the exact thickness required for the sheet; and finish the polymerization of the prepolymer by applying heat, using a heating mode chosen preferably between vapor, air, water or infrared radiation. The polymeric material used to make the joint of the mold will be selected preferably from polyvinyl chloride, vinyl ethylene acetate and polyolefin.

The sheet obtained after the curing is a modified acrylic sheet with high impact resistance, which presents an IZOD impact (ASTM D256) approximately between 1.0 and 1.6 (pounds-foot)/inch, a Gardner impact (ASTM 3029) of 40 to 100 pounds-inch, approximately, and a transmittance over 88%. The transmittance is preserved after 1000 hours of exposure to ultraviolet Xenon light, while resistance to impact is lowered to maximum 50% after the accelerated degradation.

This invention may be illustrated more clearly by the following examples, which are in no way exhaustive.

EXAMPLES

Example 1.

In an atmospheric solving tank outfitted with an agitation device with two marine type propellers revolving at 1000 r.p.m., a mix of 81 parts of methyl methacrylate is prepared with 15 parts of styrene monomer and 4 parts of high cys polybutadiene, as well as 0.6 % in weight of a mix of 2-(2',hydroxy-5-methyl-phenyl) benzotriazole and bis-2,2,6,6-tetramethyl-4-piperidinile) sebacate in a 1:1 proportion. The mix is agitated during 5 hours at an ambient temperature, after which an homogeneous dissolution is obtained.

The monomer mix is then transferred to an agitated tank reactor of batch processing, at an atmospheric pressure and with temperature control by means of water, in which 0.013% of terbutyle peroxypivalate is added as an initiator. The temperature is kept at 82° C. while the mix is agitated at 300 r.p.m., until a prepolymer with a viscosity at 82° C. of 19 seconds in a Ford Cup No 6 is obtained. The prepolymer is then brought to an ambient temperature (20° C.). It then has a viscosity of 47 seconds in a Ford Cup No 6, a conversion of 10% and a particle size of the dissolved polybutadiene of 0.1 micron.

Later, 0.3% of weight of the same initiator was added, as well as 0.0045% of dioctyl sodium sulfosuccinate as demolding agent. The prepolymer was submitted to a vacuum and through the method of mold curing a sheet of 3 mm thickness and 244 cm by 122 cm was obtained. The produced sheet didn't have any superficial flaws, it demonstrated high brightness and resistance to impact. The IZOD impact presented by the sheet was 1.2 foot/inch and the Gardner impact was 90 pounds-inch with a transmittance of 88%. The impact property was kept in 50% of the original impact after being subjected to 1000hours of ultraviolet Xenon light (ASTM G 26-92). It is worth mentioning that a sheet made of methyl methacrylate as only monomer generally has a resistance to the Gardner impact of 1.6 pounds-inch.

The material was subjected to tests of functionality by heating the sheet at 180° C. during 10 minutes and then thermoforming it at an elevation of 30 cm maintaining the impact and light transmission.

Example 2.

A mix of 96 parts of methyl methacrylate and 4 parts of polybutadiene is prepared, with a dissolution time of 4 hours. This mix is also transferred to the reactor described in example 1, 0.02% of azobisisobutyronitrile initiator was added and 0.2% of a mix of 2-(2',hydroxy-5-methyl-phenyl) benzotriazole and bis-(2,2,6,6-tetramethyl-4-piperidinile) sebacate, this mix is subjected to a reaction at 82° C. for 45 minutes until reaching a conversion of 10%.

Like in example 1, an initiator and a demolding agent were added to the cold prepolymer, in this case 0.05% in weight of azobisisobutyronitrile instead of a peroxyde type initiator and 0.0045% of dioctyl sodium sulfosuccianate as demolder. Starting from the prepolymer, a sheet was again produced with the same dimensions as in example 1, also free from superficial flaws. It presented a high brightness and resistance to IZOD impact of 0.52 pounds-foot/inch, Gardner impact of 60 pound/inch and light transmission of 80%. The impact property was maintained in 50% of the original impact after 1000 hours of ultraviolet Xenon light exposure (ASTM G 26-92).

The material was submitted to thermoforming under the same conditions as in example 1 and did not present any changes in its impact and light transmission properties after this test.

Example 3.

A prepolymer was prepared with a styrene monomer only, making it react in an agitated tank reactor for batch processing, with 0.005% in weight of azobisisobutyronitrile as initiating agent, at a temperature of 82° C. for 60 minutes. After cooling down, it presented a conversion of 8% and a viscosity of 35 seconds, Ford Cup No. 6.

Furthermore, a second prepolymer was prepared according to the description in example 1. It was prepared for curing using 003% of dioctyl terephthalate as demolder and 1.5% of terbutyle peroxypivalate. In addition, 5% in weight was added to the prepolymer prepared only with styrene, and a sheet corresponding to the description in example 1 was formed. The produced sheet was free from superficial flaws, had high brightness and resistance to impact. The Gardner impact for that sheet was 65 pound-inch, while the IZOD impact was 1.0 pound-foot/inch as well as a 50% transmittance. As may be observed, the light transmission of this type of sheet is low because it is requested in some applications like domes, lavatory partitions and luminous advertisements.

Example 4.

A prepolymer is prepared, ready for curing, according to the description in example 3. However, in this case 3% of a paste (70% TiO2/30% Dioctyl terephthalate) is added in order to obtain a white sheet.

The sheet is thermoformed at a temperature of 180° C. for 12 minutes in order to obtain a luminous advertisement with an even transmission and diffusion of light over the whole surface. The IZOD impact of the thermoformed luminous advertisement was 0.98 pound-foot/inch, while the Gardner impact was 60 pound-inch. It was observed that the material kept its shine and did not present any flaws when being subjected to heat.

As can be clearly observed in these examples, a consequence of the process of this invention is that a sheet with optimal processing characteristics is obtained. In other words, when a sheet, obtained through the process described in this invention, is later subjected to further processes of deformation by heat, it keeps its transparency and impact resistance characteristics.

It should be pointed out that in example 2, which does not include the ethylenically unsaturated monomer copolymerizable with the monomer of the type of the alkyl acrylates or alkyl methacrylates, the produced sheet, even though it did not meet the desired transmittance characteristics, kept its impact properties after being thermoformed.

In accordance with the above description, we may note that the procedure to create a prepolymer in this invention has been developed to enable the production of modified acrylic sheets with high impact resistance. It will be obvious to any specialist in the matter, that the modalities of the modified acrylic sheet resistant to impact described above are only for illustration purposes and do not limit this invention in any way, since several changes in its detail are possible without drifting away from the objective of the invention.

Even when a specific modality of the invention has been illustrated and described, it must be understood that numerous modifications to this invention are possible, as for example different pigments and initiating agents or demolders. Therefore, this invention should not be restricted except by the previous technique and the spirit of the annexed claims.

What is claimed is:

1. A procedure for the production of a modified acrylic sheet with high impact resistance of the type where at least one acrylate or alkyl methacrylate monomer, one ethylenically unsaturated monomer copolymerizable with the alkyl acrylate or alkyl methacrylate monomer, and a polymer of a dienic monomer are homogeneously mixed, followed by a mass prepolymerization of the components of the previously obtained monomer mix, through the use of a primary initiating agent so as to form a prepolymer, which is later subjected to a curing stage in order to produce sheets, in the presence of a second initiating agent wherein the prepolynerization is made in batches at a temperature of 70 to 95° C. approximately, at atmospheric pressure, so as to reduce separation of the dienic monomer polymer from the rest of the mix.

2. The procedure for the production of a modified acrylic sheet with high impact resistance of claim 1, wherein the mix of monomers includes 70 to 99 parts by weight of alkyl acrylate or alkyl methacrylate; approximately 20 parts by weight of the ethylenically unsaturated monomer, copolymerizable with the alkyl acrylates or alkyl methacrylates; and approximately 1 to 6 parts by weight of the polymer of dienic monomer.

3. The procedure for the production of a modified acrylic sheet with high impact resistance of claim 2, wherein the polymer of dienic monomer is polybutadiene.

4. The procedure for the production of a modified acrylic sheet with high impact resistance of claim 3, wherein the polybutadiene is of the type with a high cys content.

5. The procedure for the production of a modified acrylic sheet with high impact resistance of claim 2, wherein the ethylenically unsaturated monomer is styrene.

6. The procedure for the production of a modified acrylic sheet with high impact resistance of claim 2, wherein the monomer of the alkyl acrylates or alkyl methacrylate type is methyl methacrylate.

7. The procedure for the production of a modified acrylic sheet with high impact resistance of claim 1, wherein at the beginning of the mixing stage, a mix of stabilizing agents for ultraviolet light is incorporated, the mix of stabilizing agents including Hals type stabilizers and derivatives of benzotriazole, in order to improve the transparency of the produced sheets, from the polymer.

8. The procedure for the production of a modified acrylic sheet with high impact resistance of claim 7, wherein the Hals type stabilizing agents for ultraviolet light are selected from bis-(1-Octyloxy-2,2,6,tetramethyl-4-piperidine) sebacate; polymero of dimethyl succinate with 4-hidroxy-2,2,6,6,tetramethyl-1-piperidine ethanol; bis(2,2,6,6,-tetramethyl-4-piperidine) sebacate; 1,3,5-triazine-2,4,6-triamino,N,N'''-[1,2-ethanediilbis [[[4,6-bis[butyl(1,2,2,6,6-pentamethyl-4-piperidine)amino]-1,3,5-triazine-2-il] imino]-3,1propanediil]]-bis[N',N''-dibutyl-N',N''-bis(1,2,2, 6,6-pentamethyl-4-piperidine)-; poly-[[6-[(1,1,3,3,-tetramethyl butyl) amino]-s-triazine-2,4-diil][[(2,2,6,6-tetramethyl-4-piperide)imino]hexarnethiylene [(2,2,6,6,-tetramethyl-4-piperide) imino]]; or, mixes of the same.

9. The procedure for the production of a modified acrylic sheet with high impact resistance of claim 7, wherein the stabilizing agents for ultraviolet light derived from benzotriazole comprise 2-(2',hydroxy-5-methyl-phenyl) benzotriazole; 2-(2H-benzotriazole-2-il)-4,6-bis(1-methyl-1-phenylethyl)phenol; 2-(5-chloro-2H-benzotriazole-2-il)-6-(1,1-dimethylethyl)-4-methylphenol; 2-(3',5'-di-ter-butyl-2'-hydroxyphenyl )-5-chlorobenzotriazole; and 2-(2H-benzotriazole-2-il)-4,6-bis( 1,1-dimethylpropyl)phenol.

10. The procedure for the production of a modified acrylic sheet with high impact resistance of claim 8, wherein the mix of stabilizing agents for ultraviolet light is added in quantity of approximately 0.2 to 1.5% by weight with respect to the monomer mix.

11. The procedure for the production of a modified acrylic sheet with high impact resistance of claim 10, wherein the mix of stabilizing agents for ultraviolet light is formed with 2-(2',hydroxy-5-methyl-phenyl)benzotriazole and bis-(2,2, 6,6-tetramethyl-4-piperidinile)sebacate.

12. The procedure for the production of a modified acrylic sheet with high impact resistance of claim 11, wherein the mix of stabilizing agents contains 50% by weight of each one of 2-(2',hydroxy-5-methyl-phenyl)benzotriazole and bis-(2,2,6,6-etramethyl-4-piperidinile)sebacate, approximately.

13. The procedure for the production of a modified acrylic sheet with high impact resistance of claim 2, wherein the mix of monomers includes approximately 1 to 6 parts by weight of the polymer of dienic monomer.

14. The procedure for the production of a modified acrylic sheet with high impact resistance of claim 12, wherein the mix of monomers includes approximately 1 to 6 parts by weight of the polymer of dienic monomer.

15. The procedure for the production of a modified acrylic sheet with high impact resistance of claim 1, wherein the primary initiating agent is added in quantities of approximately 0.01 to 0.05 by weight with respect to the monomer mix.

16. The procedure for the production of a modified acrylic sheet with high resistance of claim 15, wherein the primary initiating agent is selected from initiators of the peroxyde and of the azo type.

17. The procedure for the production of a modified acrylic sheet with high impact resistance of claim 12, wherein the primary initiating agent is selected between terbutyle peroxypivalate and azo-bis-isobutyronitrile.

18. The procedure for the production of a modified acrylic sheet with high impact resistance of claim 1, wherein the prepolymerization is done until reaching a viscosity of the polymer of 18 to 21 seconds in Ford Cup No 6 at the reaction temperature.

19. The procedure for the production of a modified acrylic sheet with high impact resistance of claim 18, wherein the cold prepolymer has a final viscosity of approximately 45 to 50 seconds in Ford Cup No 6.

20. The procedure for the production of a modified acrylic sheet with high impact resistance of claim 19, wherein the cold prepolymer has a conversion of 8 to 30% approximately.

21. The procedure for the production of a modified acrylic sheet with high impact resistance of claim 20, wherein the cold prepolymer has a particle size of the polymer of dienic monomer of 0.1 to 1 microns approximately.

22. The procedure for the production of a modified acrylic sheet with high impact resistance of claim 21, wherein the cold prepolymer has a molecular weight in approximated number of 100,000 to 1,000,000 daltons.

23. The procedure for the production of a modified acrylic sheet with high impact resistance of claim 22, wherein the cold prepolymer has polydispersities of approximately 2.0 to 3.5.

24. The procedure for the production of a modified acrylic sheet with high impact resistance of claim 1, wherein at least one demolding agent is added to the prepolymer and at least one pigment is added before the curing stage.

25. The procedure for the production of a modified acrylic sheet With high impact resistance of claim 24, wherein the demolding agent is added in quantities of 0.003% to 0.021% by weight with respect to the prepolymer.

26. The procedure for the production of a modified acrylic sheet with high impact resistance of claim 25, wherein the demolding agent is dioctyl sodium sulfosuccianate.

27. The procedure for the production of a modified acrylic sheet with high impact resistance of claim 1, wherein the second initiating agent is added in quantities of 0.15% to 2% by weight with respect to the prepolymer.

28. The procedure for the production of a modified acrylic sheet with high impact resistance of claim 27, wherein the second initiating agent is selected between peroxyde and azo type initiators.

29. The procedure for the production of a modified acrylic sheet with high impact resistance of claim 28, wherein the curing stage of the prepolymer is done with the procedure of curing in molds.

30. A modified acrylic sheet with high impact resistance produced by mixing approximately 70 to 99 parts by weight of an alkyl acrylate or alkyl methacrylate; up to approximately 20 parts by weight of an ethylenically unsaturated monomer copolymerizable with the alkyl acrylate or alkyl methacrylate; and approximately 1 to 6 parts by weight of a polymer of dienic monomer, wherein, through the curing of a prepolymer produced by a procedure of mass batch prepolymerization, at a temperature of approximately 70 to 95° C. and at atmospheric pressure, the sheet has an IZOD impact (ASTM D256) of 1.0 to 1.6 (pound-foot)/inch approximately; a Gardner impact (ASTM 3029) of 40 to 100 pound-inch; and a transmittance of over 88%.

31. The sheet of claim 30, wherein the polymer of dienic monomer comprises butadiene.

32. The modified acrylic sheet of high impact resistance of claim 30, wherein the sheet includes 0.2 to 1.5% by weight of a mix of stabilizing agents for Hals type ultraviolet light and derivatives of benzotriazole, so that the transmittance properties of the sheet arc kept after a 1000 hours exposure to Xenon ultraviolet light.

33. The modified acrylic sheet of high impact resistance of claim 32, wherein the stabilizing agents for the Hals type ultraviolet light comprise bis-(1-Octyloxy-2,2,6,6, tetramethyl-4-piperidine)sebacate; polymer of dimethyl succinate with 4-hidroxy-2,2,6,6,tetramethyl-1-piperidine ethanol; bis(2,2,6,6,-tetramethyl-4-piperidine) sebacate; 1,3,5-triazine-2,4,6-triamino,N,N'''-[1,2-ethanediilbis [[[4,6-bis [butyl(1,2,2,6,6-pentamethyl-4-piperidine)amino]-1,3,5-triazine-2-il]imino]-3,1 propanediil]]-bis[N',N''-dibutyl-N', N''bis(1,2,2,6,6-pentamethyl-4-piperidine)-; poly-[[6-[(1,1, 3,3,-tetramethyl butyl) amino]-s-triazine-2,4-diil][[(2,2,6,6-tetramethyl-4-piperide)imino]hexamethylene [(2,2.6,6,-tetramethyl-4-piperide)imino]].

34. The modified acrylic sheet with high impact resistance of claim 32, wherein the stabilizing agents for ultraviolet light derived from benzotriazole comprise 2-(2',hydroxy-5-methyl-phenyl) benzotriazole; 2-(2H-benzotriazole-2-il)-4, 6-bis(1-methyl-1phenylethyl)phenol; 2-(5-chloro-2H-benzotriazole-2-il)-6-(1,1-dimethylethyl)4-methylphenol; 2-(3',5'-di-ter-butyl-2'-hydroxyphenyl)-5-chlorobenzotriazole; 2-(2H-benzotriazole-2-il)-4,6-bis(1,1,-dimethylpropyl)phenol.

35. The modified acrylic sheet with high impact resistance of claim 32, wherein the mix of stabilizing agents for ultraviolet light comprises 2-(2',hydroxy-5-methyl-phenyl) benzotriazole and bis-(2,2,6,6-tetramethyl-4-piperidinile) sebacate.

36. The modified acrylic sheet with high impact resistance of claim 35, wherein the mix of stabilizing agents includes approximately 50% by weight of each one of 2-(2',hydroxy-5-methyl-phenyl)benzotriazole and bis-(2,2,6,6-tetramethyl-4-piperidinile)sebacate.

37. The modified acrylic sheet with high impact resistance of claim 32, wherein the transmittance properties of the sheet are reduced by at most 50% after a 1000 hours exposure to Xenon ultraviolet light.

38. The modified acrylic sheet with high impact resistance of claim 32, wherein the sheet, after being subjected to a heat deformation process, keeps its transparency and impact resistance properties.

* * * * *

UNITED STATES PATENT AND TRADEMARK OFFICE
CERTIFICATE OF CORRECTION

| | | |
|---|---|---|
| PATENT NO. | : 6,734,230 B1 | |
| APPLICATION NO. | : 10/030756 | |
| DATED | : May 11, 2004 | |
| INVENTOR(S) | : Escobar et al. | |

It is certified that error appears in the above-identified patent and that said Letters Patent is hereby corrected as shown below:

Title Page

Item (73), line 2 delete "Ocoyoacac" insert --Frente A La Estacion De F.F.C.C. Maclovio Herrera S/N Ocoyoacac, Estado De Mexico, C.P. 52740 --

Item (56) under Other Publications, line 2 after "GB;" insert -- Class A13, --

Column 7

Lines 38-39, delete "prepolynerization" and insert -- prepolymerization --

Column 8

Line 7, delete "2,2,6," and insert -- 2,2,6,6, --

Line 15, delete "hexarnethiylene" and insert -- hexamethylene --

Line 40, delete "etramethyl" and insert -- tetramethyl --

Line 53, delete "0.05" and insert -- 0.05% --

Column 9

Line 26, delete "With" and insert -- with --

UNITED STATES PATENT AND TRADEMARK OFFICE
CERTIFICATE OF CORRECTION

PATENT NO. : 6,734,230 B1
APPLICATION NO. : 10/030756
DATED : May 11, 2004
INVENTOR(S) : Escobar et al.

It is certified that error appears in the above-identified patent and that said Letters Patent is hereby corrected as shown below:

Column 10

Line 10, delete "arc" and insert -- are --

Line 21, delete "N"bis" and insert --N" -bis --

Line 23, delete "[(2,2.6,6,-" and insert --[2,2,6,6,- --

Line 29, delete "1phenylethyl" and insert -- 1-phenylethyl --

Line 30, delete "dimethylethyl)4-" and insert -- dimethylethyl)-4 --

Line 32, delete "1,1,-" and insert -- 1,1- --

Signed and Sealed this

Fifteenth Day of August, 2006

JON W. DUDAS
*Director of the United States Patent and Trademark Office*